US010038696B1

(12) United States Patent
Marcovecchio et al.

(10) Patent No.: US 10,038,696 B1
(45) Date of Patent: Jul. 31, 2018

(54) SYSTEM AND METHOD FOR CONTROLLING ACCESS TO ENTERPRISE NETWORKS

(71) Applicant: BLACKBERRY LIMITED, Waterloo (CA)

(72) Inventors: Vincenzo Kazimierz Marcovecchio, Toronto (CA); Glenn Daniel Wurster, Kitchener (CA); Jonathon Brookfield, Great Cambourne (GB)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 15/728,832

(22) Filed: Oct. 10, 2017

(51) Int. Cl.
*G06F 7/00* (2006.01)
*H04L 29/06* (2006.01)
(52) U.S. Cl.
CPC ............ *H04L 63/10* (2013.01); *H04L 63/029* (2013.01); *H04L 67/42* (2013.01)
(58) Field of Classification Search
CPC ........ G06F 21/31; G06F 21/33; G06F 21/335; H04L 63/0807; H04L 63/0815; H04L 63/083; H04L 63/105; H04L 63/168
See application file for complete search history.

(56) References Cited

U.S. PATENT DOCUMENTS

| 9,420,002 | B1* | 8/2016 | McGovern | H04L 63/10 |
| 2013/0305312 | A1* | 11/2013 | Gomez | H04L 63/08 726/1 |
| 2014/0189781 | A1* | 7/2014 | Manickam | H04L 67/34 726/1 |
| 2014/0204834 | A1* | 7/2014 | Singh | H04W 40/22 370/315 |
| 2014/0230020 | A1* | 8/2014 | Mogaki | H04L 63/10 726/4 |
| 2014/0283061 | A1* | 9/2014 | Quinlan | H04L 63/1408 726/23 |
| 2017/0214804 | A1* | 7/2017 | Payne, III | H04M 15/725 |
| 2017/0223624 | A1* | 8/2017 | Maria | H04W 48/18 |
| 2017/0235848 | A1* | 8/2017 | Van Dusen | G06F 17/30979 705/12 |

* cited by examiner

*Primary Examiner* — Joseph P Hirl
*Assistant Examiner* — Sayed Bheshti Shirazi
(74) *Attorney, Agent, or Firm* — Perry + Currier Inc.

(57) ABSTRACT

A method in an access control server of controlling access to an enterprise network includes: receiving, at the access control server from a client computing device outside the enterprise network, a request to establish a connection between the client computing device and an enterprise server in the enterprise network; at the access control server, responsive to receiving the request, obtaining a security attribute of the enterprise server from a central repository outside the enterprise network; determining, based on the security attribute, whether the enterprise server meets a predefined security threshold; and when the enterprise server does not meet the predefined security threshold, denying the request to establish a connection between the client computing device and the enterprise server.

14 Claims, 5 Drawing Sheets

SYSTEM AND METHOD FOR
CONTROLLING ACCESS TO ENTERPRISE
NETWORKS

FIELD

The specification relates generally to communication systems, and specifically to a system and method for controlling access to enterprise networks in communication systems.

BACKGROUND

Enterprise networks typically deploy firewalls to monitor connections between the enterprise networks and computing devices external to the enterprise networks. Client devices external to the enterprise networks but associated with the enterprise networks may seek to connect to resources within the enterprise network. Such connections, however, may render the enterprise network vulnerable to attacks (e.g. from malicious client devices). Certain network architectures, such as those in which end-to-end encryption between client devices and enterprise networks is used, may reduce the effectiveness of conventional firewall deployments that inspect traffic originating at the client device.

SUMMARY

An aspect of the specification provides a method in an access control server of controlling access to an enterprise network, including: receiving, at the access control server from a client computing device outside the enterprise network, a request to establish a connection between the client computing device and an enterprise server in the enterprise network; at the access control server, responsive to receiving the request, obtaining a security attribute of the enterprise server from a central repository outside the enterprise network; determining, based on the security attribute, whether the enterprise server meets a predefined security threshold; and when the enterprise server does not meet the predefined security threshold, denying the request to establish a connection between the client computing device and the enterprise server.

A further aspect of the specification provides an access control server, comprising: a communications interface; a processor connected to the communications interface, the processor configured to: receive, via the communications interface from a client computing device outside the enterprise network, a request to establish a connection between the client computing device and an enterprise server in the enterprise network; responsive to receiving the request, obtain a security attribute of the enterprise server from a central repository outside the enterprise network; determine, based on the security attribute, whether the enterprise server meets a predefined security threshold; and when the enterprise server does not meet the predefined security threshold, deny the request to establish a connection between the client computing device and the enterprise server.

A further aspect of the specification provides a non-transitory computer-readable storage medium storing a plurality of computer-readable instructions executable by a processor of an access control server for configuring the processor to perform a method comprising: receiving, at the access control server from a client computing device outside the enterprise network, a request to establish a connection between the client computing device and an enterprise server in the enterprise network; at the access control server, responsive to receiving the request, obtaining a security attribute of the enterprise server from a central repository outside the enterprise network; determining, based on the security attribute, whether the enterprise server meets a predefined security threshold; and when the enterprise server does not meet the predefined security threshold, denying the request to establish a connection between the client computing device and the enterprise server.

BRIEF DESCRIPTIONS OF THE DRAWINGS

Embodiments are described with reference to the following figures, in which.

DETAILED DESCRIPTION

Figure 1:
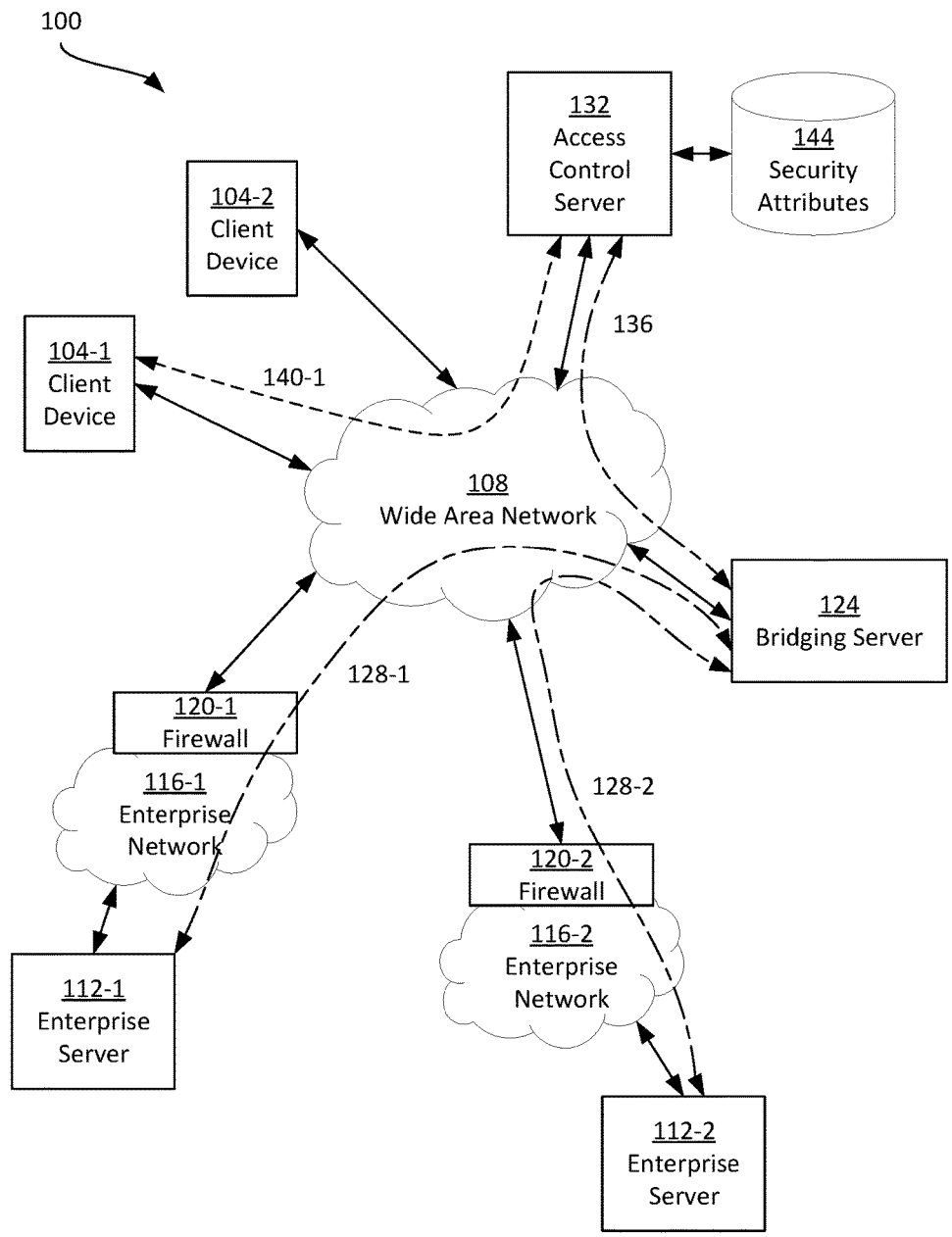
FIG. 1 depicts a communication system, according to a non-limiting embodiment.

FIG. 1 depicts a communications system 100. System 100 includes a plurality of client computing devices, of which two examples 104-1 and 104-2 are shown (referred to generically as a client computing device 104 or a client device 104, and collectively as client computing devices 104 or client devices 104; this nomenclature is also employed with other elements in this disclosure). Each client device 104 is any suitable one of a cellular phone, a smart phone, a tablet computer, a desktop computer, and the like. In general, each client computing device 104 includes a central processing unit (CPU) and a memory in the form of one or more integrated circuits (ICs), as well as input and output devices, such as a touch screen integrated with a display. Each client device 104 may store, in the above-mentioned memory, one or more applications that are executable by the above-mentioned processor to perform a variety of functions.

Certain client device applications (e.g., email and other messaging applications, cloud storage applications, and the like) require access to resources not located on the client devices 104 themselves. As such, each client device 104 also includes a communications interface, such as a wireless radio assembly, enabling the client device 104 to communicate with other computing devices via a wide-area network 108, such as the Internet. The client devices 104 may connect to the WAN 108 via any suitable combination of wired and wireless links, which may traverse additional networks, such as mobile networks, local area networks (LANs) and the like, not shown in FIG. 1.

The resources referred to above are provided on one or more service provider servers accessible to the mobile devices 104 via the network 108. In the present example in particular, certain resources required by an application (e.g. a messaging application) executed by the client device 104-1 are provided by an enterprise server 112-1. The client device 104-1, in other words, is associated with the enterprise server 112-1 and the enterprise network 116-1 in which the enterprise server 112-1 is deployed. The enterprise network 116-1 is, in the present example, a corporate LAN, and the client device 104-1 is a corporate mobile computing device assigned to an employee of the corporate entity controlling the network 116-1. The client device 104-1 is configured to retrieve data from the enterprise server 112-1 during the execution of the above-mentioned messaging application.

For example, the client device 104-1 can be configured to retrieve messages from the enterprise server 112-1 that are addressed to a messaging account assigned to the above-mentioned employee. As seen in FIG. 1, the enterprise network 116-1 is connected to the WAN 108 via an enterprise firewall 120-1. The client device 104-2, meanwhile, may be associated with a further enterprise network 116-2 containing an enterprise server 112-2 and connected to the WAN 108 via further enterprise firewall 120-2. A plurality of other client devices 104 and enterprise networks 116, each containing one or more enterprise servers 112, may also be provided in other embodiments. Further, more than one client device 104 can be associated with a given enterprise network 116.

Each enterprise server 112, as will be apparent to those skilled in the art, includes one or more central processing units and memory components. The CPU of each enterprise server 112 is configured to execute one or more applications stored in the memory to perform various functions. Such functions include the receipt and servicing of requests from client devices 104 associated with the enterprise server 112.

In the present example, the system 100 is configured to enable the establishment of connections between enterprise servers 112 and client devices 104 that are encrypted end-to-end. Specifically, the system 100 is configured to enable the client device 104-1 to establish a connection with the enterprise server 112-1 that is encrypted such that payload data exchanged between the enterprise server 112-1 and the client device 104-1 (such as data for the above-mentioned messaging application) is substantially indecipherable to any intermediate component of the system 100, including routing hardware within the WAN 108 and the firewall 120-1. As will be understood by those skilled in the art, additional data such as routing information may encapsulate the above-mentioned payload data. Such additional data may also be encrypted in some embodiments, but can be decrypted by intermediate components.

Further, the system 100 is configured to reduce or eliminate the need to reconfigure the firewall 120 of a given enterprise network 116 in order to permit the enterprise server 112 to receive and respond to requests from a client device 104. In order to enable the enterprise server 112-1 to receive a request from the client device 104-1, for example, it is typically necessary to configure the firewall 120-1 to permit inbound connections on a predefined port (i.e. to open that port), which the client device 104-1 is configured to employ in requests sent to the enterprise server 112-1. In system 100, however, such inbound requests may still reach the enterprise server 112-1 despite the firewall 120-1 being provisioned without such a port opening.

To that end, the system 100 includes a bridging server 124 connected to the WAN 108. Each enterprise server 112 is configured, for example upon startup, to transmit a request to the bridging server 124 to establish a persistent (and encrypted, in the present example) connection, also referred to herein as a tunnel, between the enterprise server 112 and the bridging server 124. The enterprise servers 112 may, for example, be preconfigured with a network identifier of the bridging server 124 (e.g., an IP address, URL, or the like) for use in generating and sending the above-mentioned request. Thus, the enterprise server 112-1 is configured to request the establishment of a tunnel 128-1, and the enterprise server 112-2 is configured to request the establishment of a tunnel 128-2. Logical connections such as the tunnels 128 are illustrated in dashed lines in FIG. 1, while physical links between elements of the system 100 (over which the logical connections are established) are illustrated in solid lines. Because each tunnel 128 originates via an outgoing request from the respective enterprise server 112, rather than from an incoming request (e.g. from the bridging server 124), the firewalls 120 need not be reconfigured to permit establishment of the tunnels 128.

The bridging server 124 is configured, as will be discussed in greater detail below, to route traffic to and from the enterprise servers 112 over the tunnels 128 for any of a variety of services. For example, the bridging server 124 can be configured to route data traffic between the enterprise server 112-1 and the client device 104-1 over (among other connections, as will be discussed below in greater detail) the tunnel 128-1. The client devices 104 are also configured to establish connections with the bridging server 124 to communicate with the enterprise servers 112. In particular, the client devices 104 are configured to request access to the enterprise servers 112 via an access control server 132 connected to the network 108.

The access control server 132 is configured to receive and process requests from client devices 104 to access resources (such as enterprise servers 112) within enterprise networks 116. In particular, the access control server 132 is configured to initiate establishment of an encrypted connection between the client devices 104 and the enterprise servers 112 via the bridging server 124. Once such a connection is established, an enterprise server 112 can provide the service requested by a client device 104. In some examples, the enterprise server 112 can implement one or more authentication mechanisms, such as prompting a client device 104 for authentication credentials (e.g. account identifiers and associated passwords) before providing the requested service to the client device 104.

The access control server 132 is configured, upon startup, to establish a connection 136 with the bridging server 124. Each client device 104 is configured to request access to an enterprise network 116 by establishing a connection 140 to the access control server 132, whose network address may be preconfigured within the client devices 104 (e.g. as a stored IP address, URL or the like, including or accompanied by an attribute identifying the particular enterprise server 112 with which the client device 104 is associated). A connection 140-1 is shown established between the client device 104-1 and the access control server 132.

In response to a request from a client device 104, such as the client device 104-1, the access control server 132 can facilitate the connection between the client device 104-1 and the enterprise server 112-1, for example, by storing an association between the connection 140-1 and the connection 136, or by providing routing information to the client device 104-1 enabling the client device 104-1 to establish a connection directly with the bridging server 124 (not shown). The access control server 132 is further configured to send an instruction to the bridging server 124 to associate the client device 104-1 with the tunnel 128-1, permitting the flow of data between the client device 104-1 and the enterprise server 112-1 via the bridging server 124. The instruction from the access control server 132 to associate the connections 136 and 140-1 (or any other suitable connection between the client device 104-1 and the bridging server 124) with the tunnel 128-1 enables the client device 104-1 and the enterprise server 112-1 to negotiate an encrypted connection carried over the tunnel 128-1.

The system architecture shown in FIG. 1 as noted earlier, reduces the need for reconfiguration of firewalls 120, and permits the establishment of connections between client devices 104 and enterprise servers 112 employing end-to-end encryption. However, the above system architecture may also enable malicious client devices (e.g. malicious software installed on the client device 104-1, with or without the knowledge of the operator of the client device 104-1) to exploit vulnerabilities in the enterprise servers 112. In particular, the access control server 132 is publicly accessible via the WAN 108 in order to permit the client devices 104 to reach the access control server 132 via the WAN 108. Any client device may therefore request access to any enterprise server via the access control server 132. Following establishment of a connection between a client device 104 and an enterprise server 112 via the access control server 132 and the bridging server 124, the tunnel 128-1 permits the client device 104 to effectively bypass the corresponding firewall 120. Further, the end-to-end encryption between the client devices 104 and the enterprise servers 112 may prevent other network components, such as the access control server 132 and the bridging server 124, from inspecting traffic to detect potential attacks on the enterprise networks 116. The above-mentioned vulnerabilities may therefore be exploited by a malicious client device to gain access to other portions of the enterprise network 116, or to damage the functionality of the enterprise server 112 itself.

To mitigate the above risks, the access control server 132 is also configured to implement one or more security checks, with reference to a repository 144 of security attributes corresponding to the enterprise servers 112, prior to facilitating the connection of a client device 104 with an enterprise server. The security check functionality implemented by the access control server 132 will be discussed in greater detail below.

Figure 2:
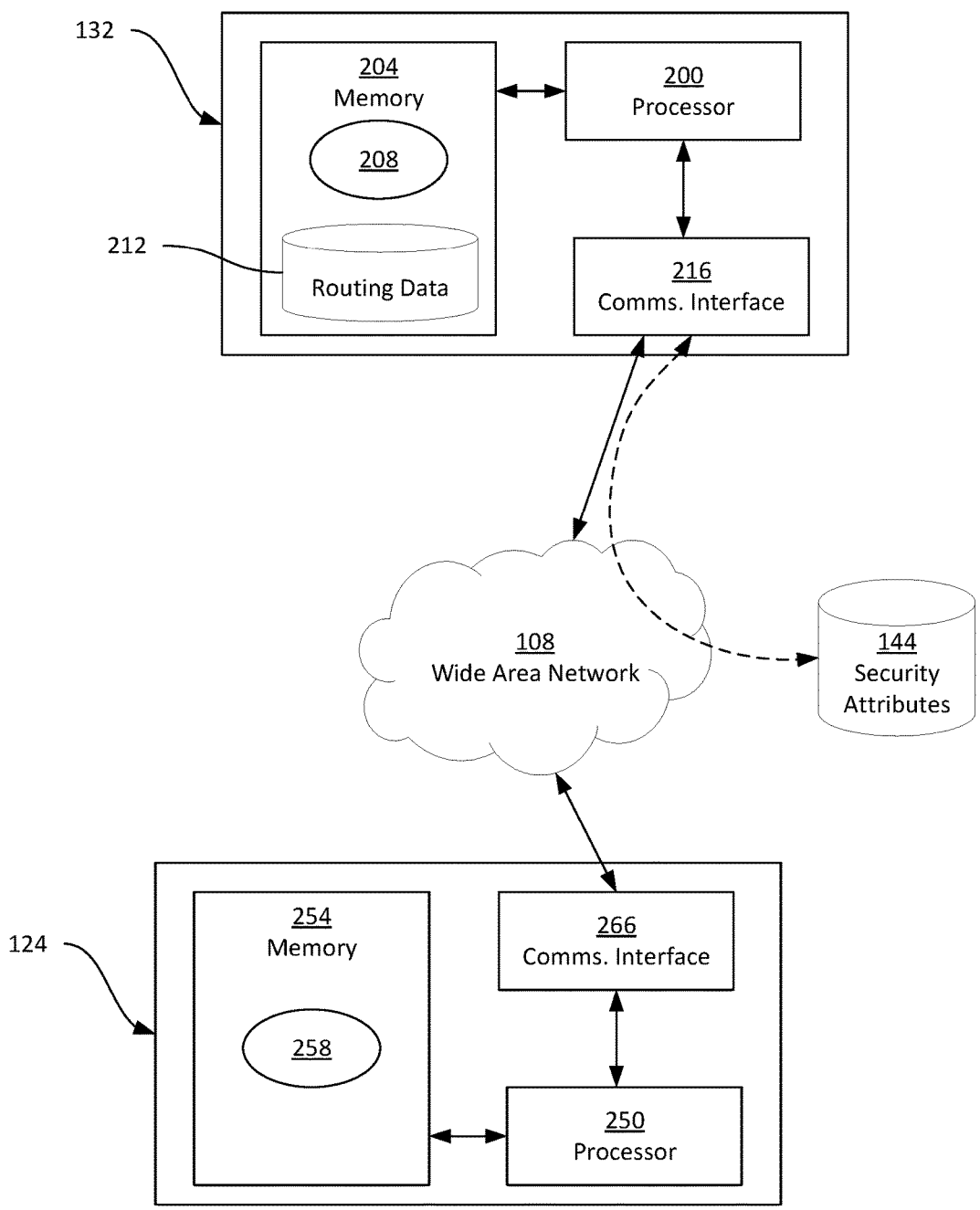
FIG. 2 depicts certain internal components of the access control server of the system of FIG. 1, according to a non-limiting embodiment.

Prior to discussing the security-related functionality of the access control server 132, certain internal components of the access control server 132 and the bridging server 124 will be discussed, with reference to FIG. 2. As shown in FIG. 2, the access control server 132 includes a central processing unit (CPU) 200, also referred to herein as a processor 200, in the form of one or more integrated circuits (ICs). The processor 200 is interconnected with a non-transitory computer readable storage medium, such as a memory 204. The memory 204 includes any suitable combination of volatile (e.g. Random Access Memory or RAM) and non-volatile memory (e.g. read only memory or ROM, Electrically Erasable Programmable Read Only Memory or EEPROM, flash memory). The memory 204 stores computer readable instructions executable by processor 200, including an access control application 208, also referred to herein as the application 208.

The processor 200 executes the instructions of the application 208 to perform, in conjunction with the other components of the access control server 132, various functions related to receiving and handling requests from the client devices 104 to access the enterprise servers 112. In the discussion below of those functions, the access control server 132 is said to be configured to perform those functions—it will be understood that the access control server 132 is so configured via the execution of the instructions in the application 208 by the processor 200.

The memory 204 also stores a routing data repository 212. The repository 212 may contain, for example, identifiers of each of the enterprise servers 112. In some embodiments, a plurality of bridging servers 124 may be deployed, for example to service geographically disparate enterprise networks 116. In such embodiments, the routing data 212 may also indicate associations between enterprise servers 112 and individual bridging servers 124.

The access control server 132 also includes a communications interface 216 interconnected with processor 200, which enables the access control server 132 to connect to the WAN 108. The communications interface 216 thus includes the necessary hardware, such as network interface controllers and the like (e.g. one or more Ethernet controllers), to communicate over the WAN 108. The access control server 132 may also include input devices and output devices interconnected with the processor 200, such as a keyboard, a display and the like (not shown).

As illustrated in FIG. 2, the repository 144 of security attributes is accessed by the access control server 132 via the communications interface 216 and the WAN 108. That is, the repository 144 is stored in a memory of another computing device (e.g., the bridging server 124 or a further server not shown in FIG. 1). In other examples, however, the repository 144 is stored directly on the access control server 132, in the memory 204. The repository 144 may also be stored on a plurality of computing devices in the system 100 in other examples. That is, a portion of the contents of the repository 144, which will be discussed in greater detail below, may be stored at the access control server 132, while another portion may be stored externally to the access control server 132 and accessed via the WAN 108.

The bridging server 124 includes a central processing unit (CPU) 250, also referred to herein as a processor 250, in the form of one or more integrated circuits (ICs). The processor 250 is interconnected with a non-transitory computer readable storage medium, such as a memory 254. The memory 254 includes any suitable combination of volatile (e.g. Random Access Memory or RAM) and non-volatile memory (e.g. read only memory or ROM, Electrically Erasable Programmable Read Only Memory or EEPROM, flash memory). The memory 254 stores computer readable instructions executable by processor 250, including a bridging application 258. As noted above, in some embodiments the memory 254 also stores the repository 144 of security attributes.

The processor 250 executes the instructions of the application 258 to perform, in conjunction with the other components of the bridging server 124, various functions related to establishing connections between the client devices 104 and the enterprise servers 112. In the discussion below of those functions, the bridging server 124 is said to be configured to perform those functions—it will be understood that the bridging server 124 is so configured via the execution of the instructions in the application 258 by the processor 250.

The bridging server 124 also includes a communications interface 266 interconnected with processor 250, which enables the bridging server 124 to connect to the WAN 108. The communications interface 266 thus includes the necessary hardware, such as network interface controllers and the like (e.g. one or more Ethernet controllers), to communicate over the WAN 108. The bridging server 124 may also include input devices and output devices interconnected with the processor 250, such as a keyboard, a display and the like (not shown).

Figure 3:
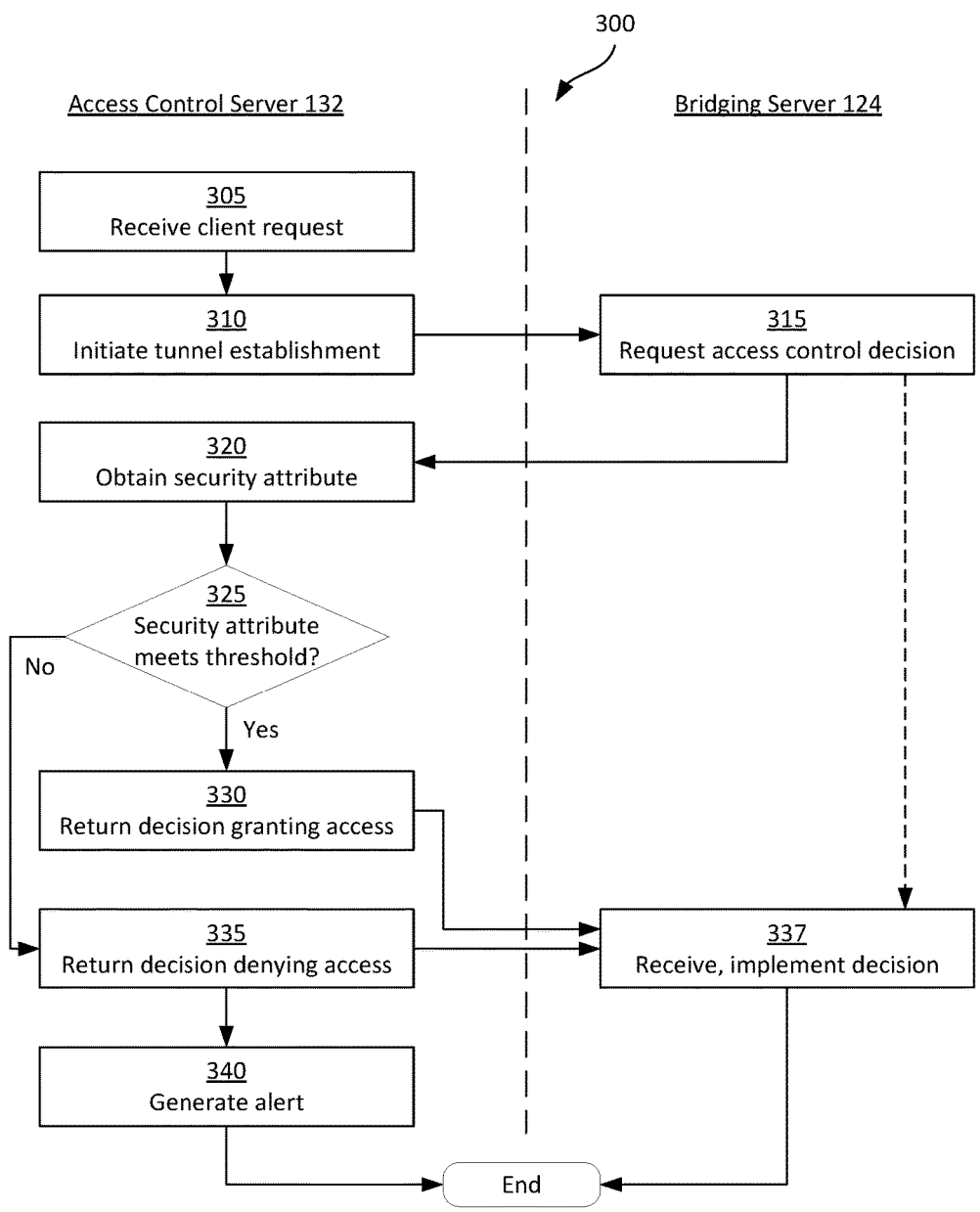
FIG. 3 depicts a method of controlling access to enterprise networks.

Turning now to FIG. 3, a method 300 of controlling access to enterprise networks 116 is illustrated. The method 300 will be discussed below in conjunction with its performance on the system 100. In particular, certain blocks of the method 300 as discussed below are performed by the access control server 132, via the execution of the application 208 by the processor 200, while other blocks of the method 300 are performed by the bridging server 124, via the execution of the application 258 by the processor 250.

At block 305, the access control server 132 is configured to receive a request from a client device 104 to access an enterprise network 116. In the present example, prior to receiving the request at block 305, the access control server 132 is configured to establish the connection 136 with the bridging server 124. For example, the access control server 132 may be configured to establish the connection 136 upon startup, as noted earlier.

In the present example performance of the method 300, a request is received by the access control server 132 from the client device 104-1 at block 305. For example, the client device 104-1 can be configured to transmit a request, via the WAN 108, to access the enterprise server 112-1. The request can take the form, for example, of a URL previously stored on the client device 104-1, such as "https://bes112-1.ac132.com". The string "ac132.com" in the above example corresponds to the access control server 132, and the string "bes112-1" identifies the enterprise server 112-1, to which the client device 104-1 is requesting access. The request is routed to the access control server 132, for example based on the domain string "ac132.com" noted above, and the client device 104-1 and the access control server 132 are configured to establish the connection 140-1 as shown in FIG. 1. For example, the client device 104-1 and the access control server 132 may be configured to establish the connection 140-1 as a secure connection. Such a connection may be established employing any suitable secure communications protocol, such as Hyper Text Transfer Protocol Secure (HTTPS, also referred to as HTTP over Transport Layer Security (TLS)).

At block 310, the access control server 132 is configured to initiate establishment of a tunnel between the client device 104-1 and the enterprise server 112-1, via the bridging server 124. In the present embodiment, the access control server 132 is configured to send an instruction to the bridging server, via the connection 136, to associate the connections 140-1 and 136 with the tunnel 128-1. As will now be apparent to those skilled in the art, for requests received from other client devices 104 or requests for access to other enterprise servers 112, the above-mentioned instruction to the bridging server 124 indicates the appropriate combination of other connections 140 and tunnels 128. The access control server 132 may consult the routing repository 212 to select an appropriate bridging server 124, when more than one bridging servers 124 are present in the system 100.

Figure 4:
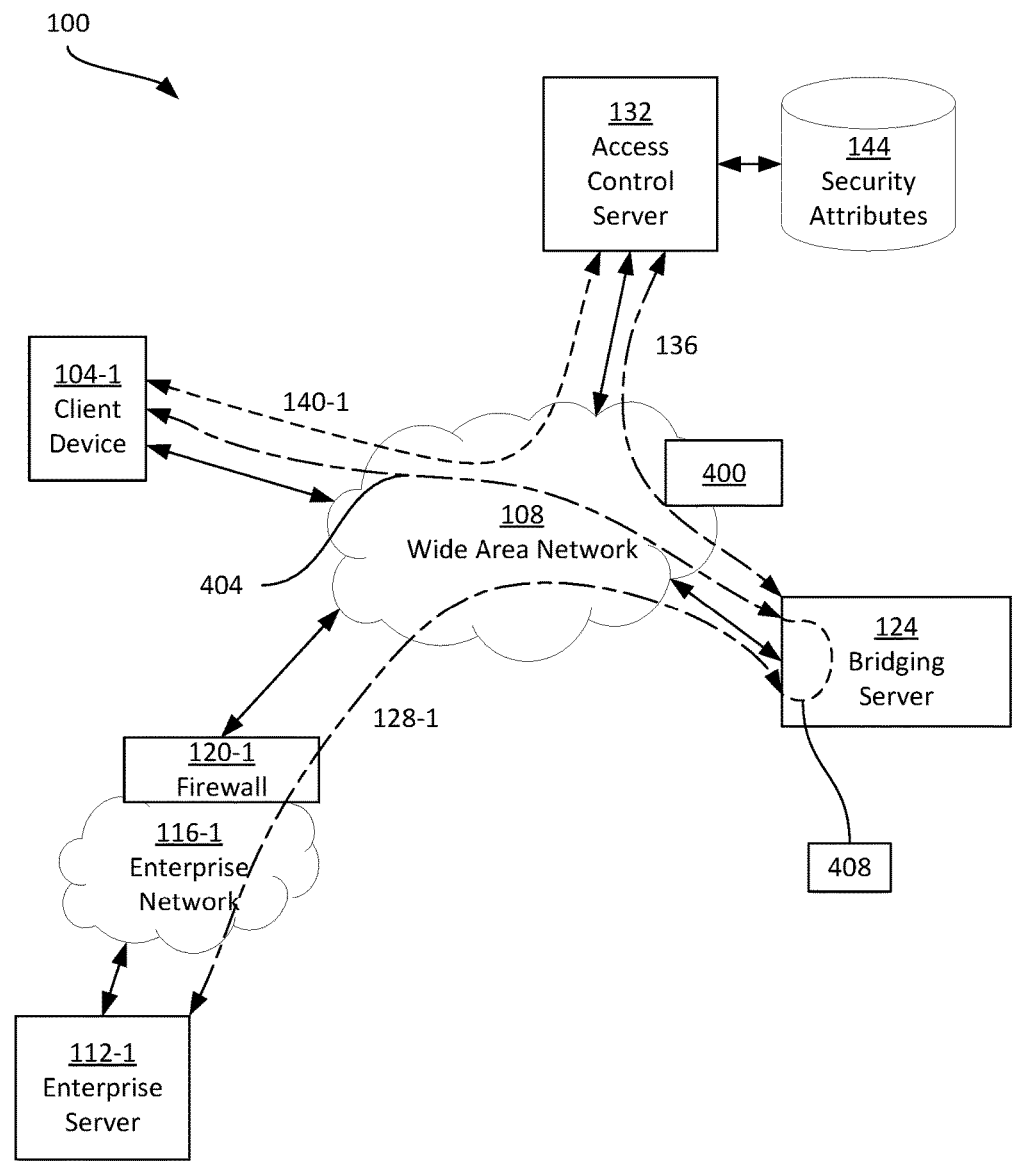
FIG. 4 depicts a portion of the system of FIG. 1 during the performance of the method of FIG. 3.

Referring to FIG. 4, a portion of the system 100 (excluding the enterprise network 116-2 and the client device 104-2) is illustrated during the performance of block 310. The access control server 132 is configured to transmit an instruction 400 over the connection 136 to the bridging server 124. The instruction causes the bridging server 124 to associate the tunnel 128-1 with the connections 140-1 and 136. In other examples, as also illustrated in FIG. 4, a connection 404 may be established directly between the client device 104-1 and the bridging server 124 (e.g., with the assistance of the access control server 132 responsive to the request received at block 305). An association between the connection 404 and the tunnel 128-1 may be stored at the bridging server 124, as illustrated as an internal link 408.

At block 315, the bridging server 124 is configured, in addition to storing the internal link 408 or any other suitable association in the memory 254 to define a tunnel between the client device 104-1 and the enterprise server 112-1, to request an access control decision from the access control server 132 rather than to permit the client device 104-1 access to the requested resource (i.e., the enterprise server 112-1 in the present example). The bridging server 124 is therefore configured, in the present embodiment, to await a response from the access control server 132 before beginning to route data over the tunnel between the client device 104-1 and the enterprise server 112-1 (as indicated by the dashed line toward block 337).

At block 320, the access control server 132 is configured, responsive to the access control decision request from the bridging server 124, to obtain at least one security attribute corresponding to the enterprise server 112-1. The at least one security attribute is obtained from the repository 144, and the specific actions taken by the access control server 132 to obtain the at least one security attribute are dependent on the specific deployment of the repository 144. In some examples, as noted earlier, the repository 144 is maintained at a computing device distinct from the access control server 132, and at block 320 the access control server 132 is therefore configured to transmit a request, via the communications interface 216 and the WAN 108, for the at least one security attribute. The request includes at least an identifier of the enterprise server 112 to which access is requested (per the request received at block 305). In other examples, in which the repository 144 is stored in the memory 204, the access control server 132 performs block 320 by retrieving the at least one security attribute directly (i.e., without transmitting a request to another computing device) from the repository 144 in the memory 204.

In general, the repository 144 is a central source of security attributes corresponding to each of the enterprise servers 112 in the system 100. In some examples, the repository 144 includes security attributes for only a subset of the enterprise servers 112 in the system 100. For example, each enterprise server 112 may be required to opt in to the process performed by the access control server 132 discussed herein, and security attributes may therefore be stored only for those enterprise servers 112 that have opted in. The repository 144 may be populated according to a variety of mechanisms. In the present example, when each enterprise server 112 establishes a respective tunnel 128, the enterprise server 112 transmits, over the tunnel 128, any one of, or any suitable combination of, a variety of security attributes. In the present example, the enterprise server 112 transmits version information for at least an enterprise management application executed by the enterprise server 112 to service requests from client devices 104, as well as version information for a secure communications protocol employed by the enterprise server 112 to establish the tunnel 128. In other examples, the enterprise server 112 can also transmit version information for any of a variety of other software, communications protocols, and the like. For example, if a plurality of distinct applications are executed by the enterprise server 112 to serve client requests (e.g, distinct applications corresponding to various types of client requests, such as a messaging application and a cloud storage application), version information may be transmitted from the enterprise server 112 for each application.

The data transmitted by the enterprise server 112 upon establishment of the tunnel 128 is stored in the repository 144. For example, when the repository 144 is stored at the access server 132, the bridging server 124 is configured to forward the above-mentioned version information to the access control server 132 over the connection 136. In other examples, in which the repository is stored at a computing device distinct from the bridging server 124 and the access control server 132, the bridging server 124 is configured to forward the version information to the other computing device. In still other examples, the bridging server 124 is configured to forward the data to the access control server 132, which is in turn configured to instruct another computing device hosting the repository 144 to perform any necessary updates thereto. Table 1, below, illustrates an example set of security attributes as maintained in the repository 144.

TABLE 1

Security Attributes Repository 144

| Server ID | Enterprise Version | Secure Comms. Protocol Version | Known Vulnerabilities? | Blacklisted IP Addresses |
|---|---|---|---|---|
| 112-1 | 5.1 | 1.1 | Yes | 1.2.3.4 |
| 112-2 | 6.0 | 1.2 | No | N/A |

In particular, as seen above, the repository 144 includes a set of security parameters for each enterprise server 112. The security parameters include an "enterprise version" and a secure communications protocol version (e.g., the version of the HTTPS protocol used to communicate over the tunnel 128 or the TLS mechanism deployed therewith).

The security attributes stored in the repository 144 also include an indication of whether any known vulnerabilities correspond to the version information received from the enterprise server. For example, Table 1 indicates that a known vulnerability exists with one or both of the software version and the secure communications protocol version currently deployed by the enterprise server 112-1. In other examples, the existence of known vulnerabilities may be indicated on a per-version basis, rather than as a single flag as in Table 1, In further examples, the known vulnerabilities may be stored separately from the version information. For example, the repository 144 may include a separate table (not shown) containing an indication of whether known vulnerabilities exist for each of a plurality of versions of enterprise software and communications protocols. As will now be apparent, the repository 144 may also contain more detailed information as to the nature of the vulnerabilities, if any exist. For example, a degree of severity may be indicated in association with the vulnerability flag; in another example, a plurality of flags may be stored in association with each version, indicating the presence (or absence) of vulnerabilities with varying degrees of severity.

When the repository 144 is stored at a computing device other than the access server 132, the response received to the above-mentioned request for security attributes may include any or all of the attributes in the discussion above. In other examples, however, the response may simply include an indication of whether any vulnerability flag associated with the enterprise server 112-1 is set to "true" (e.g., the value "Yes" in Table 1, or any other suitable value, such as a binary 1 or the like).

As also seen in Table 1, the repository 144 can include one or more auxiliary security attributes. In contrast to the security attributes discussed above, which define characteristics of the enterprise servers 112 themselves, the auxiliary attributes may relate to other computing devices. For example, Table 1 indicates that a blacklist has been associated with the enterprise server 112-1, indicating that the IP address "1.2.3.4.5" is not permitted to access the enterprise server 112-1. Other auxiliary security attributes may also be stored in the repository 144, including whitelisted IP addresses, rate limits, and the like.

At block 325, the access control server 132 is configured to determine whether the security attribute obtained at block 320 satisfies a predetermined security threshold. In general, the security threshold defines one or more conditions that, if met by the security attributes, indicate that the enterprise server 112 is sufficiently secure to permit access to the enterprise server 112 by the client device 104 from which the request at block 305 was received.

The nature of the threshold, which is preconfigured in the application 208, is dependent upon the nature of the security attributes obtained at block 320. For example, if at block 320 the access control server 132 receives a simple indication (e.g., from another computing device) that vulnerabilities exist in connection with the enterprise server 112-1, the threshold is a requirement that the indication by that no known vulnerabilities exist in connection with the enterprise server 112-1. In other examples, the indication may include a degree of severity of such known vulnerabilities, and the threshold may therefore define a maximum allowable degree of severity. In still further examples, in which the access server 132 retrieves or receives separate indications of vulnerabilities corresponding to distinct software components or communications protocols, the threshold can include a plurality of thresholds, each corresponding to a particular software component or communications protocol.

When the determination at block 325 is affirmative, the performance of the method 300 proceeds to block 330. At block 330, the access control server 132 is configured to return a decision to the bridging server 124 granting access to the enterprise server 112-1 (that is, effectively granting the initial request received at block 305). The decision may be sent to the bridging server as an indication that the access requested at block 305 (and to which the instruction sent at block 310 related) is granted. Following receipt of the access control decision indicating that access is granted, the bridging server 124 is configured, at block 337 to implement the decision by permitting data traffic to flow between the client device 104-1 and the enterprise server 112-1 over the tunnel established using the connections 140-1, 136 and 128-1. The client device 104-1 and the enterprise server 112-1 may then negotiate a secure connection for delivery of the service requested by the client device 104-1.

Figure 5A:
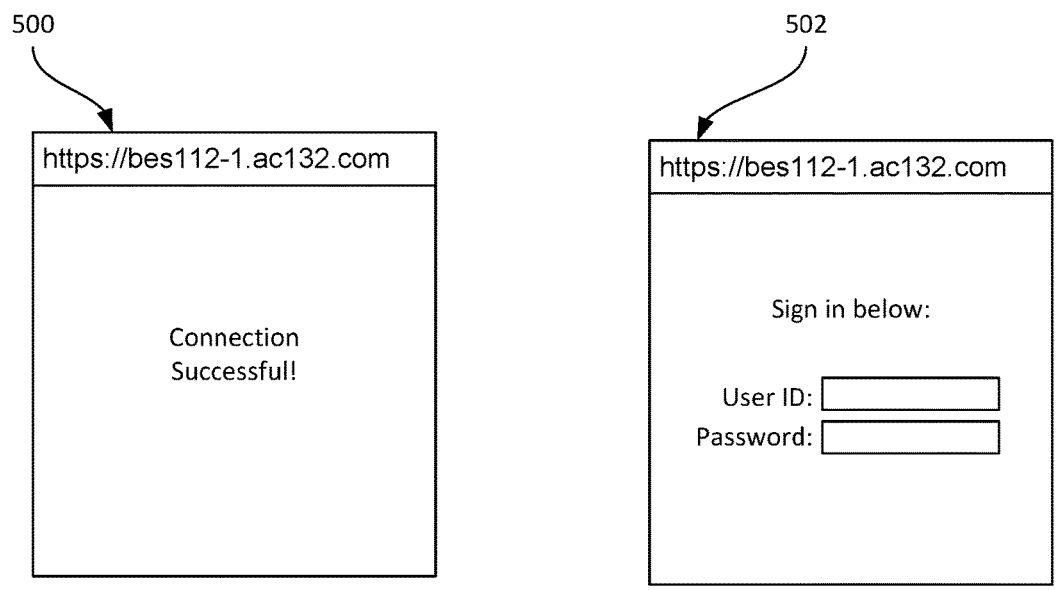
FIGS. 5A and 5B depict example messages returned to a client device of the system of FIG. 1 during the performance of the method of FIG. 3.

Referring briefly to FIG. 5A, at block 330 the access control server 132 or the bridging server 124 may be configured to transmit an indication to the client device 104-1 that the requested connection with the enterprise server 112-1 is being established. For example, a web page 500 may be served to the client device 104-1, following which the client device 104-1 may negotiate the above-mentioned secure connection (e.g. using end-to-end encryption) with the enterprise server 112-1. When the secure connection between the enterprise server 112-1 and the client device 104-1 has been established, the enterprise server 112-1 may transmit a web page 502 to the client device 104-1 prompting the client device 104-1 for authentication parameters (such as a username and password) before providing access to the requested service.

Figure 5B:
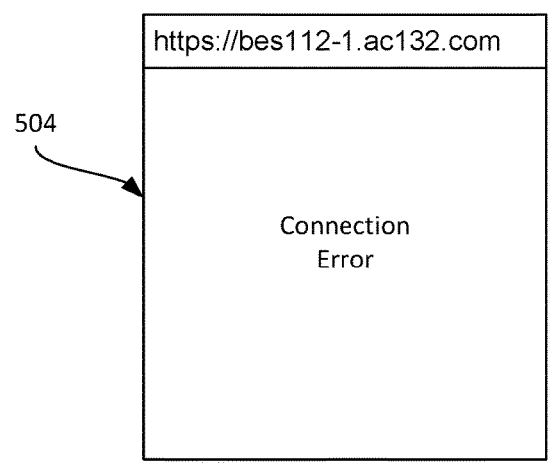

Returning to FIG. 3, when the determination at block 325 is negative, indicating that the enterprise server 112-1 may be vulnerable to attacks from malicious client devices, the access control server 132 proceeds instead to block 335. At block 335, the access control server 132 is configured to return a decision to the bridging server 124 denying access to the enterprise server 112-1. In some embodiments, the decision sent at block 335 simply contains an indication that access is denied. In other embodiments, the decision can include a reason for the denial (e.g., that the denial results from an outdated security protocol at the enterprise server 112-1). The bridging server 124 is configured to implement the decision denying access at block 337 by, for example, discarding the association previously stored between the tunnel 128-1 and the connections 140-1 and 136 (or the connection 404, in other embodiments). As a result of implementing the decision denying access at block 337, the bridging server 124 does not permit data traffic to flow between the client device 104-1 and the enterprise server 112-1. At block 335, the access control server 132 or the bridge server 124 may also be configured to provide an error message to the client device 104-1, such as the web page shown 504 shown in FIG. 5B. In other words, when the determination at block 325 is negative, the access control server 132 is configured to block access to the enterprise network 116-1 for the client device 104-1 at the bridging server 124.

When auxiliary security parameters are included in the repository 144, as shown in Table 1, such auxiliary parameters may be obtained at block 320 and compared to the request received at block 305, For example, the determination at block 325 may include the above determination as to whether the security attributes satisfy the predefined threshold, as well as a determination as to whether the client request received at block 305 satisfies the auxiliary security attributes.

Returning to FIG. 3, the access control server 132 is configured, at block 340, to generate one or more alerts responsive to denying the request received at block 305. The alert(s) generated at block 340, in general, serve to notify an administrator of the enterprise server 112-1 that an inbound client connection has been denied due to potential vulnerabilities at the enterprise server 112-1 itself (rather than an indication of malicious activity at the client device 104-1). The alert generated at block 340 can take any one of, or any suitable combination of, a variety of forms. For example, the access control server 132 can be configured to transmit an alert to the enterprise server 112-1 over the connection 136 and the tunnel 128-1 (that is, via the bridging server 124).

As will be apparent to those skilled in the art, the enterprise server 112-1 typically includes an alert generation mechanism for communicating (e.g. to administrators) errors received from the bridging server 124. In other examples, the access control server 132 stores one or more identifiers in the memory 204 corresponding to computing devices associated with administrators of the enterprise server 112-1. The access control server 132 is therefore, at block 340, configured to retrieve one or more such identifiers and transmit notifications to the corresponding devices via the WAN 108 (but not necessarily via the bridging server 124). The notifications transmitted at block 340 can include any one or more of email, short message service (SMS), instant messaging (IM) and telephone (e.g. audible recordings) notifications. The alerts generated at block 340 indicate any one or more of the date and time of the refusal at block 335, the identifier of the client device 104 from which the request was received at block 305, and a reason for the refusal at block 335 (e.g., a known vulnerability is associated with the currently implemented communications protocol at the enterprise server 112-1). Following the performance of block 340, the method 300 ends.

Variations to the above systems and methods are contemplated. For example, although the method 300 as discussed above includes the assessment of security attributes for every client request, in other embodiments the access control server 132 may be configured to perform blocks 320 and 325 for only a subset of requests received from client devices 104. For example, the access control server 132 can be configured to perform blocks 320 and 325 once for each of a predefined number of client requests, or once in a predefined time period. For any client requests for which blocks 320 and 325 are not performed, the access control server 132 can be configured to apply the outcome of the most recent performance of block 325 for the relevant enterprise server 112.

In further variations, the access control server 132 and the bridging server 124 can be implemented as single computing device implementing the functionality of both servers 124 and 132 as discussed above.

Those skilled in the art will appreciate that in some embodiments, the functionality of the application 208 as executed by the processor 200 may be implemented using pre-programmed hardware or firmware elements (e.g., application specific integrated circuits (ASICs), field programmable gate arrays (FPGAs), etc.), or other related components.

The scope of the claims should not be limited by the embodiments set forth in the above examples, but should be given the broadest interpretation consistent with the description as a whole.

The invention claimed is:

1. A method in an access control server of controlling access to an enterprise network, comprising:
    establishing a connection between the access control server and a bridging server; the bridging server configured to maintain a tunnel connection with an enterprise server;
    receiving, at the access control server from a client computing device outside the enterprise network, a request to establish a connection between the client computing device and the enterprise server in the enterprise network;
    initiating establishment of a connection between the client computing device and the enterprise server via the bridging server by associating the tunnel connection with the client computing device;
    at the access control server, responsive to receiving the request, obtaining a security attribute of the enterprise server from a central repository outside the enterprise network;
    determining, based on the security attribute, whether the enterprise server meets a predefined security threshold;
    when the enterprise server does not meet the predefined security threshold, denying the request to establish a connection between the client computing device and the enterprise server, wherein denying the request to establish the connection comprises sending a command to the bridging server to block data traffic between the client computing device and the enterprise server; and
    when the enterprise server meets the predefined security threshold, allowing the request by sending a command from the access control server to the bridging server to route data traffic between the client computing device and the enterprise server.

2. The method of claim 1, wherein obtaining the security attribute includes sending a request to a further computing device hosting the central repository; and receiving the security attribute in response to the request.

3. The method of claim 1, wherein the central repository contains respective security attributes for each of a plurality of enterprise servers in respective enterprise networks.

4. The method of claim 3, wherein the security attribute indicates whether known vulnerabilities are associated with the enterprise server.

5. The method of claim 1, further comprising:
obtaining an auxiliary security attribute from the central repository; and
determining whether the request to establish the connection satisfies the auxiliary security attribute.

6. The method of claim 5, further comprising:
denying the request to establish a connection when at least one of (i) the determination of whether the enterprise server meets the predefined security threshold, and (ii) the determination of whether the request to establish the connection satisfies the auxiliary security attribute, are negative.

7. An access control server, comprising:
a communications interface;
a processor connected to the communications interface, the processor configured to:
establish a connection between the access control server and a bridging server; the bridging server configured to maintain a tunnel connection with an enterprise server;
receive, via the communications interface from a client computing device outside an enterprise network, a request to establish a connection between the client computing device and the enterprise server in the enterprise network;
initiate establishment of a connection between the client computing device and the enterprise server via the bridging server by associating the tunnel connection with the client computing device;
responsive to receiving the request, obtain a security attribute of the enterprise server from a central repository outside the enterprise network;
determine, based on the security attribute, whether the enterprise server meets a predefined security threshold;
when the enterprise server does not meet the predefined security threshold, deny the request to establish a connection between the client computing device and the enterprise server by sending a command to the bridging server to block data traffic between the client computing device and the enterprise server; and
when the enterprise server meets the predefined security threshold, allow the request by sending a command from the access control server to the bridging server to route data traffic between the client computing device and the enterprise server.

8. The access control server of claim 7, the processor further configured to obtain the security attribute by sending a request to a further computing device hosting the central repository; and receive the security attribute in response to the request.

9. The access control server of claim 7, wherein the central repository contains respective security attributes for each of a plurality of enterprise servers in respective enterprise networks.

10. The access control server of claim 9, wherein the security attribute indicates whether known vulnerabilities are associated with the enterprise server.

11. The access control server of claim 7, the processor further configured to:
obtain an auxiliary security attribute from the central repository; and
determine whether the request to establish the connection satisfies the auxiliary security attribute.

12. The access control server of claim 11, the processor further configured to:
deny the request to establish a connection when at least one of (i) the determination of whether the enterprise server meets the predefined security threshold, and (ii) the determination of whether the request to establish the connection satisfies the auxiliary security attribute, are negative.

13. The access control server of claim 1, further comprising:
a memory storing the central repository;
the processor further configured to obtain a security attribute of the enterprise server by retrieving the security attribute from the memory.

14. A non-transitory computer-readable storage medium storing a plurality of computer-readable instructions executable by a processor to perform operations comprising:
establishing a connection between an access control server and a bridging server; the bridging server configured to maintain a tunnel connection with an enterprise server;
receiving, at the access control server from a client computing device outside an enterprise network, a request to establish a connection between the client computing device and the enterprise server in the enterprise network;
initiating establishment of a connection between the client computing device and the enterprise server via the bridging server by associating the tunnel connection with the client computing device;
at the access control server, responsive to receiving the request, obtaining a security attribute of the enterprise server from a central repository outside the enterprise network;
determining, based on the security attribute, whether the enterprise server meets a predefined security threshold;
when the enterprise server does not meet the predefined security threshold, denying the request to establish a connection between the client computing device and the enterprise server, wherein denying the request to establish the connection comprises sending a command to the bridging server to block data traffic between the client computing device and the enterprise server; and
when the enterprise server meets the predefined security threshold, allowing the request by sending a command from the access control server to the bridging server to route data traffic between the client computing device and the enterprise server.

* * * * *

UNITED STATES PATENT AND TRADEMARK OFFICE
CERTIFICATE OF CORRECTION

PATENT NO. : 10,038,696 B1  
APPLICATION NO. : 15/728832  
DATED : July 31, 2018  
INVENTOR(S) : Vincenzo Kazimierz Marcovecchio, Glenn Daniel Wurster and Jonathon Brookfield Page 1 of 1

It is certified that error appears in the above-identified patent and that said Letters Patent is hereby corrected as shown below:

In the Claims

Column 14, Line 18 Claim 13: delete "1" and insert --7-- after "claim".

Signed and Sealed this  
Thirteenth Day of October, 2020

Andrei Iancu  
*Director of the United States Patent and Trademark Office*